United States Patent
Celi, Jr. et al.

(10) Patent No.: US 7,103,157 B2
(45) Date of Patent: Sep. 5, 2006

(54) AUDIO QUALITY WHEN STREAMING AUDIO TO NON-STREAMING TELEPHONY DEVICES

(75) Inventors: Joseph Celi, Jr., Boca Raton, FL (US); Brett J. Gavagni, Sunrise, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 10/246,232

(22) Filed: Sep. 17, 2002

(65) Prior Publication Data

US 2004/0052338 A1 Mar. 18, 2004

(51) Int. Cl.
*H04M 11/06* (2006.01)

(52) U.S. Cl. .................. 379/88.16; 370/352; 434/350; 715/732

(58) Field of Classification Search ............. 379/88.22, 379/88.23, 88.25, 88.26; 370/352
See application file for complete search history.

(56) References Cited

U.S. PATENT DOCUMENTS

| | | | |
|---|---|---|---|
| 4,602,129 A * | 7/1986 | Matthews et al. ....... | 379/88.26 |
| 5,649,060 A * | 7/1997 | Ellozy et al. ............... | 704/278 |
| 5,663,951 A | 9/1997 | Danneels et al. ........... | 370/230 |
| 5,674,003 A | 10/1997 | Andersen et al. ........... | 364/514 |
| 5,726,989 A | 3/1998 | Dokic ......................... | 370/509 |
| 5,732,279 A | 3/1998 | Wood et al. ................. | 395/821 |
| 5,951,646 A * | 9/1999 | Brandon ..................... | 709/231 |
| 5,991,373 A * | 11/1999 | Pattison et al. ........... | 379/93.17 |
| 6,104,706 A | 8/2000 | Richter et al. .............. | 370/263 |
| 6,259,691 B1 * | 7/2001 | Naudus ..................... | 370/352 |
| 6,282,196 B1 | 8/2001 | Lyons et al. ................ | 370/394 |
| 2002/0001369 A1 * | 1/2002 | Merwin et al. ............ | 379/67.1 |
| 2002/0097842 A1 * | 7/2002 | Guedalia et al. ........... | 379/67.1 |

* cited by examiner

*Primary Examiner*—Gerald Gauthier
(74) *Attorney, Agent, or Firm*—Akerman-Senterfitt

(57) ABSTRACT

A method of providing streaming audio to a non-streaming telephony audio interface can include receiving audio segments of a complete audio message and storing the audio segments in memory. A size of the audio segments can be determined. A callback can be registered for each of the audio segments, wherein each registered callback can be provided a timer value associated with the size of the audio segment for which the callback was registered. The complete audio message can be played when an active one of the callback timers expires.

16 Claims, 2 Drawing Sheets

AUDIO QUALITY WHEN STREAMING AUDIO TO NON-STREAMING TELEPHONY DEVICES

BACKGROUND OF THE INVENTION

1. Technical Field

The invention relates to the field of telephony and, more particularly, to improving audio quality in telephony devices.

2. Description of the Related Art

Many legacy telephony devices, for example telephony audio interface cards, do not support audio streaming, that is, the real-time transmission of multimedia data, for example using real-time transport protocol. Such non-streaming devices are designed to support interactive voice response applications in a mode referred to as half duplex. An audio interface operating in half duplex mode cannot send and receive audio simultaneously. Rather, the audio interface provides audio, and when finished playing a complete audio prompt, enters a record mode to receive audio from a caller for processing.

Modern telephony platform products such as Websphere Voice Server, available from International Business Machines Corporation of Armonk, N.Y., and other products which can include speech recognition and text-to-speech functions as are commonly provided as part of interactive voice response (IVR) systems, can simultaneously send and receive audio. That is, such products, referred to as full duplex products, can receive audio for processing within a speech recognition engine while sending audio generated by a text-to-speech engine, a voice browser, or a voice server over the telephony system. Although pre-recorded audio clips can be provided to a caller as well, full duplex products allow users to "barge-in" or interrupt the playing of a long audio prompt with a spoken response.

TTS engines, voice browsers, voice servers, and/or other audio sources utilized within full duplex systems which stream audio tend to send a series of randomly sized portions of audio comprising a complete audio prompt. When audio portions are provided to legacy telephony interfaces for playback to a caller in this manner, the legacy telephony audio interface is not able to determine a start point or an end point for a complete audio prompt. Rather, the telephony audio interface plays each audio portion as the audio portion is received as if the audio portion were a complete audio prompt.

Typically, when non-streaming telephony audio interfaces receive a first portion of an audio prompt, the interface enters a play mode during which time no further portions of the audio prompt can be received. In fact, such audio interfaces cannot be provided with an additional portion of the audio prompt until such time after the telephony audio interface has finished playing the first portion of the audio prompt and has issued a message notifying the audio source that the telephony audio interface is ready to receive the next portion of the audio prompt. Issuance of the message to the audio source can take approximately 10–20 milliseconds. In consequence, spaces or periods of silence frequently occur between successive audio portions of a single, complete audio prompt when played through a conventional non-streaming telephony audio interface. The periods of silence within the audio prompt are due at least in part to the time for the telephony audio interface to issue the ready message after playing a portion of audio, the network latency for routing the message from the telephony audio interface to the audio source, as well as the time needed to send the next portion of the audio prompt from the audio source to the interface.

Several disadvantages can result when silence is disposed between successive audio portions of an audio prompt. One disadvantage is that callers frequently experience a significant amount of latency when listening to streamed audio as played through a legacy audio interface. "Latency", as defined herein, refers to the time required for a caller to receive a response from an audio source such as an IVR application after the caller speaks a command.

Another disadvantage of using a legacy telephony audio interface to process streamed audio is that the silence interspersed between successive audio portions of a single, complete audio prompt, can be perceived as unnatural sounding audio prompts. In some cases, the resulting audio not only sounds unnatural, but may be perceived by callers as being distorted. For example, such is the case where an individual word is broken between two successive audio portions of a single audio prompt. In that case, the audio interface plays one audio portion of the complete prompt with the audio portion ending in the middle of a word, pauses, and then plays the subsequent audio portion of the audio prompt which begins with the second half of the broken word. When played in this manner, the resulting audio prompt sounds distorted.

SUMMARY OF THE INVENTION

The invention disclosed herein provides a solution for achieving improved audio quality when playing streamed audio prompts via legacy audio interfaces which are not configured to support streamed audio. In particular, the present invention provides a method of intelligently buffering portions of a complete audio prompt or message. The playback of each audio segment can be delayed until each audio segment of the complete audio prompt is buffered. The buffered audio segments can be provided sequentially to the legacy audio interface, for example a telephony audio interface, allowing the complete audio prompt to be played back without noticeable periods of silence disposed between the individual audio segments. The present invention does not require knowledge of the starting and ending locations of the complete audio prompt, which typically is not available from the streamed audio. Accordingly, the latency experienced by a caller, as well as perceived audio distortions, can be significantly reduced.

One aspect of the present invention can include a method of providing streaming audio to a non-streaming telephony audio interface. The method can include receiving audio segments of a complete audio message and storing the audio segments in memory. The audio segments can be randomly sized. A size of the audio segments can be determined and a timer can be started for each of the audio segments. Notably, each timer can be started upon receiving an associated one of the audio segments. Each started timer can be cleared prior to starting a new one of the timers.

Each of the timers can be set or initialized with a timer value associated with the size of one of the audio segments for which the timer was started. The complete audio message can be sent to the telephony audio interface when an active one of the timers expires.

For example, the expired timer can initiate the sending step over a different thread of execution. Each received audio segment of the complete audio message can be sent in the sequence in which the audio segments were received and without time delays disposed between adjacent ones of the audio segments. In particular, the audio segments can be sent without noticeable or perceivable time delays between the audio segments.

The method further can include the telephony interface playing the complete audio message. The complete audio message can be played without time delays, for example noticeable or perceivable time delays, disposed between adjacent ones of the audio segments.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for achieving improved audio quality when playing streamed audio prompts via legacy audio interfaces which are not configured to support streaming audio. In particular, the present invention provides a method of intelligent buffering such that the legacy telephony audio interface need not have knowledge of the start and ending location of a complete audio prompt. The audio segments of a complete audio prompt can be collected and then provided to a legacy telephony audio interface for playback without periods of silence disposed between the individual audio segments.

Figure 1:
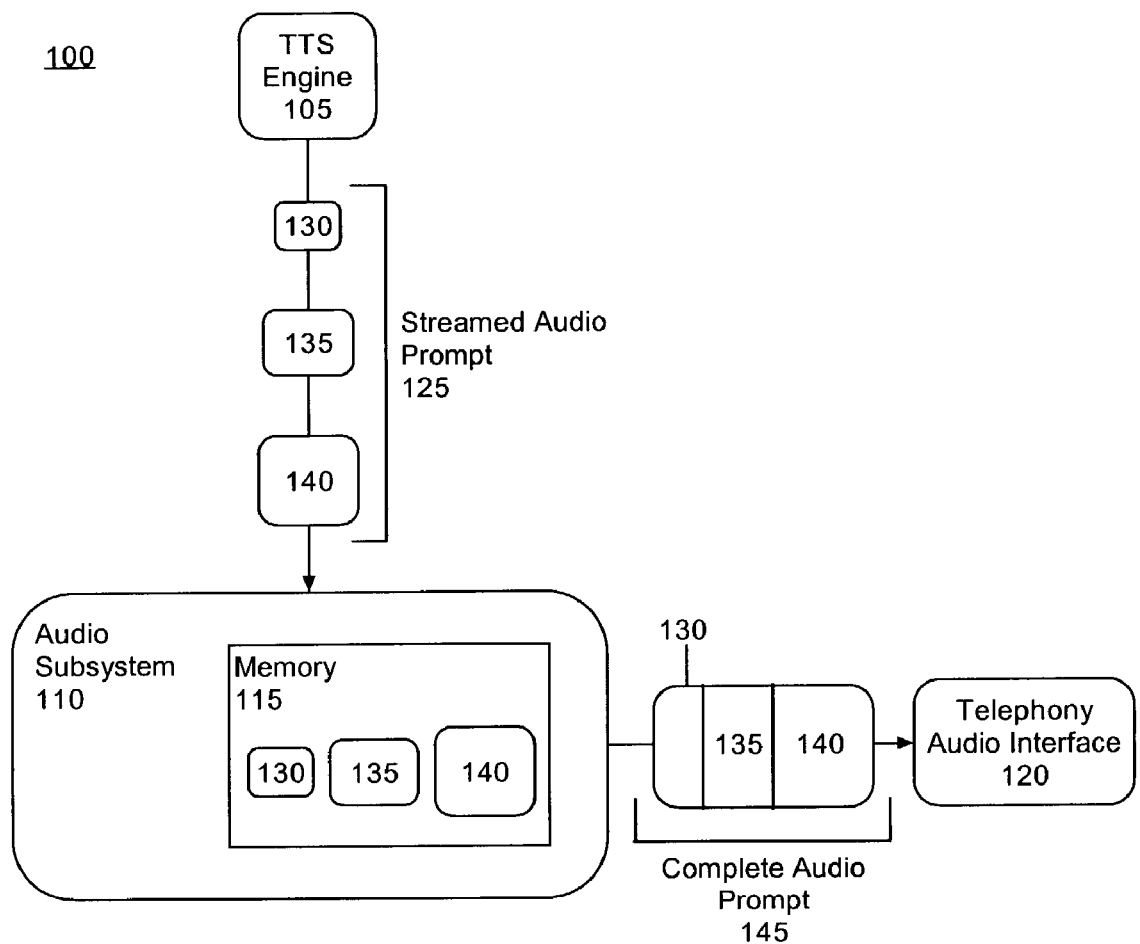
FIG. 1 is a schematic diagram illustrating a portion of a telephony system for playing audio prompts to callers.

FIG. 1 is a schematic diagram illustrating a portion of a telephony system 100 for playing audio prompts to callers. As shown in FIG. 1, the system 100 can include a text-to-speech (TTS) engine 105, an audio subsystem 110 having a memory 115, and a telephony audio interface 120. The TTS engine 105 can be configured to provide streamed audio output. The audio subsystem 110 can serve as an interface between the TTS engine 105 and the telephony audio interface 120. Accordingly, the audio subsystem 110 can be configured to store received portions of audio prompts from the TTS engine 105 and buffer the received portions so that a complete audio prompt subsequently can be provided to the telephony interface 120.

The telephony interface 120 can include legacy audio interfaces, for example, one or more audio interface cards for use with telephony systems which are not configured to receive or play streamed audio. Such legacy telephony audio interfaces further can include half duplex interfaces. The TTS engine 105, the audio subsystem 110, and the telephony audio interface 120 can be included within a larger interactive voice response (IVR) telephony system as is known in the art.

In operation, the TTS engine 105 can provide a streamed audio prompt 125 to the audio subsystem 110. The streamed audio prompt 125 is comprised of one or more audio segments, for example audio segments 130, 135, and 140, which can be provided to the audio subsystem 110. Each of the audio segments 130–140 of the streamed audio prompt 125 is randomly sized as provided by the TTS engine 105. Accordingly, the audio subsystem 110 has no advance knowledge of where one audio prompt ends and another audio prompt begins. Nor does the audio subsystem 110 have knowledge of audio segment sizes to be received or the number of audio segments forming a complete audio prompt. The audio subsystem 110 can store the received audio segments 130–140 within the memory 115 or buffer.

The audio subsystem 110 can utilize a system of setting and clearing callbacks, as will be described with reference to FIG. 2 in further detail, to determine when all audio segments forming a complete audio prompt have been received. At such time, the audio subsystem 110 can read out the various audio segments, in this case audio segments 130–140, which form the complete audio prompt 145, in the order in which the audio segments were received by the audio subsystem 110. In consequence, the telephony interface 120 receives the complete audio prompt without gaps or periods of silence disposed between the respective audio segments 130–140. The telephony interface 120 can play the complete audio prompt 145 without a significant degree of distortion or "unnaturalness" as is commonly encountered when playing streamed audio through a legacy telephony interface not configured to process streamed audio.

Figure 2:
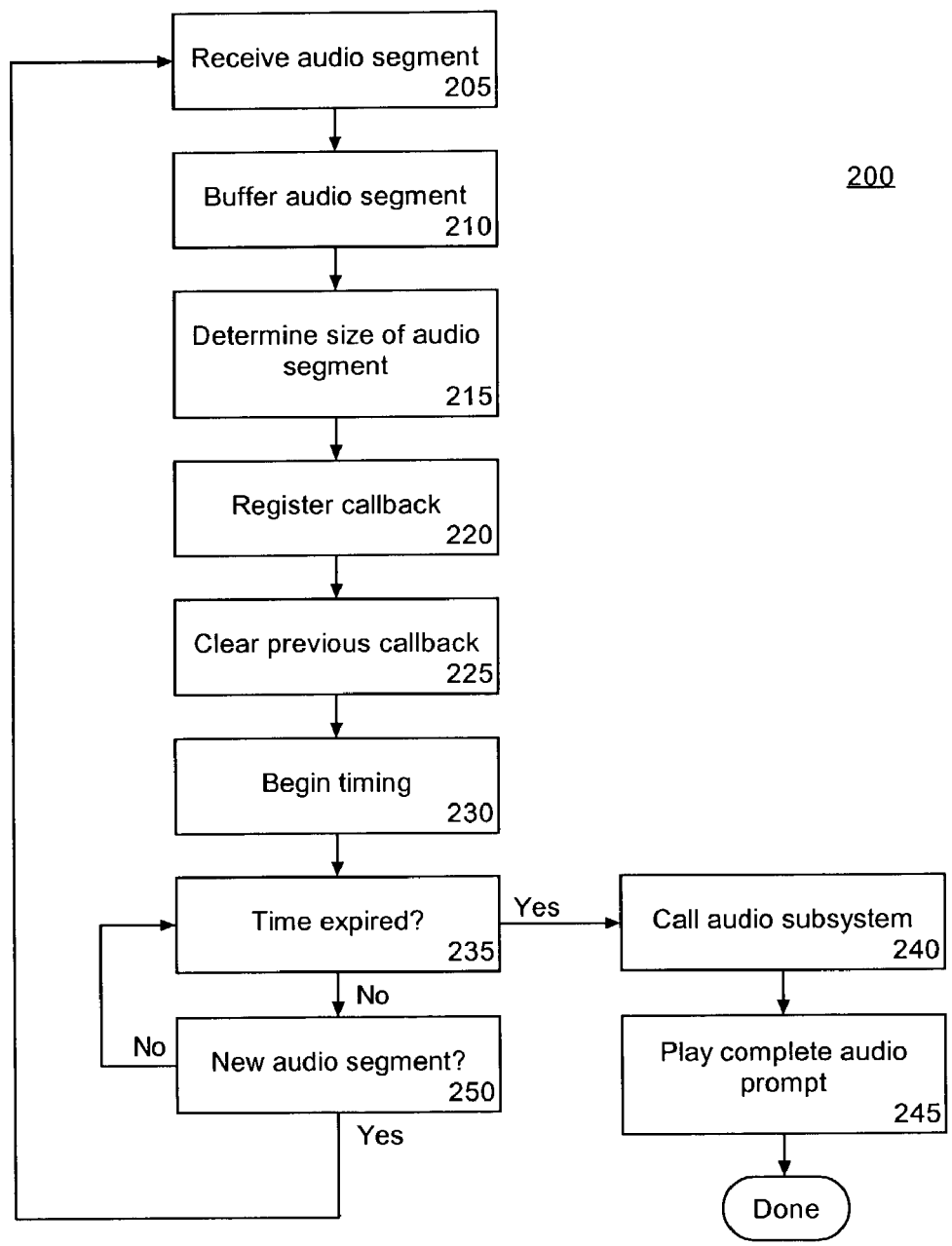
FIG. 2 is a flow chart illustrating a method of playing audio prompts to callers.

FIG. 2 is a flow chart illustrating a method 200 of playing audio prompts to callers. The method 200 can begin in a state wherein a telephony IVR system is providing audio prompts to a caller. Accordingly, in step 205, the audio subsystem can receive an audio segment, for example "audio segment A", streamed from an audio source such as a TTS engine, a voice browser, a voice server, or the like. As noted, streamed audio segments are randomly sized and include no indication as to the size of each audio segment or the number of audio segments which form a given complete audio prompt. Rather, the audio subsystem can distinguish one audio segment from another by detecting periods of silence or periods of inactivity wherein no audio is received between consecutive portions of audio data.

In step 210, the received audio segment is stored or buffered in the audio subsystem memory. The audio subsystem can determine the size of the received audio segment in step 215. As the sample rate and size of each sample is known, the size of the received audio segment can be determined as well as the amount of time required to audibly play the audio segment in real-time. In step 220, the audio subsystem can register a callback. The callback is a software object which can be called and passed a value specifying a unit of time to be used in setting a callback timer. The value can be specified in any suitable time keeping unit such as milliseconds, microseconds, or the like. The callback object implements the timer to count down the specified time period. As the callback timer counts down, the audio subsystem is prevented from providing the received audio segment to the legacy telephony audio interface.

The callback will return control to the audio subsystem upon expiration of the timer. In particular, according to one aspect of the present invention, when the specified time period has elapsed, the callback object will call the audio subsystem on a separate thread of execution. Accordingly, the audio subsystem can asynchronously receive audio and initiate playback of the stored audio. By registering a callback when each audio segment is received, the audio subsystem delays playback of received audio segments until expiration of the timer, thereby providing the audio subsystem more time to collect further audio segments of a complete audio prompt.

Notably, the timer value passed to the callback object by the audio subsystem can vary according to the size of the received audio segment. In particular, the more time that is required to play the audio segment, the larger the timer value to be passed to the callback registered for the received audio segment. For example, if the audio segment requires 1 second for playback, the timer can be set to 500 milliseconds. Similarly, if the audio segment requires 1.5 seconds for playback, the timer can be set to 750 milliseconds. Regardless, the time value to be passed to a callback can be determined via an algorithm, a lookup table, or other construct which can be determined through empirical analysis.

Importantly, the timer value should be large enough such that the timer allows sufficient time for receiving another audio segment of a same audio prompt. According to one embodiment of the present invention, the audio segments can be expected to arrive from the audio source at least as fast as the audio segments can be played in real-time. Thus, each callback timer can be set for a time period not exceeding the time required to playback the audio segment for which the callback has been registered, or any fraction thereof. Still, the particular technique used to determine the timer value can take into account additional factors such as network congestion.

In step 225, once a callback is registered, the callback automatically determines whether another callback is active for an audio segment and can clear the active callback. In particular, the newly registered callback, for example callback A corresponding to audio segment A, can identify whether a callback has been set for an audio segment received just prior to the audio segment A. If so, the callback A clears the callback associated with the previous audio segment, thereby preventing the expiration of the prior callback timer. By clearing the previously registered callback each time a subsequent audio segment is received, the playback of received audio segments is further delayed. Notably, the prior callback is only cleared if the newly registered callback, for example callback A, is set or registered prior to the expiration of the prior callback timer.

In step 230 the timer set in the callback object, for example callback A, can begin timing. In step 235 a determination can be made as to whether the timer has expired. If so, the method can continue to step 240 where the audio subsystem is called by the callback object on a different thread of execution. The expiration of the timer of callback A serves as an indication to the audio subsystem that all audio segments forming a complete audio prompt have been received. Thus, in step 245, the audio subsystem is instructed to provide the complete audio prompt to the legacy telephony audio interface. The audio subsystem can provide each buffered audio segment in the order in which the audio segment was received without significant or noticeable pauses or silences disposed between the audio segments. The audio segments effectively can be provided as a single audio segment forming the complete audio prompt.

Accordingly, the telephony audio interface can play the received audio segments comprising the complete audio prompt. The audio segments can be played in the order in which the audio segments were received and without significant or noticeable pauses or silences disposed between the audio segments. Notably, the audio subsystem memory can be cleared after the audio segments are provided to the telephony audio interface.

If the timer has not expired, however, the method can continue from step 235 to step 250 where a determination can be made as to whether a new audio segment has been received. If not, the method can loop back to step 235 to repeat as necessary until the timer expires or a new audio segment is received. If a new audio segment is received, the method can proceed to step 205 to repeat as necessary.

Those skilled in the art will recognize that as each new audio segment is received, a corresponding new callback is registered, which automatically clears the previously set callback. Accordingly, so long as additional audio segments are received prior to the expiration of the previously registered callback timer, the received audio segments are not played, but rather are accumulated in memory. As the timers are set according to the time required to play the audio segments, and the segments are to be provided faster than can be played in real-time, timer expiration can coincide with the accumulation of a complete audio prompt. Thus, the accumulated audio segments can be provided to the telephony audio interface only after expiration of a timer, and more particularly, where a new audio segment is not received prior to the expiration of an active, or the only, callback timer.

The invention disclosed herein enables the audio subsystem to package complete audio prompts to be sent to the telephony audio interface for playback to a caller. By providing a complete audio prompt, the present invention reduces the likelihood of audio distortion being introduced into the audio prompt due to the sending of incomplete audio prompts as commonly occurs when audio sources that support audio streaming are interfaced with legacy devices that do not support audio streaming. The present invention further reduces latency experienced by callers.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of providing streaming audio to a non-streaming telephony audio interface comprising:
   receiving audio segments of a complete audio message and storing said audio segments in memory;
   differentiating each of said audio segments one from cap another by detecting at least one of periods of silence and periods in which no audio is received between a pair of consecutive portions of audio data;
   determining respective sizes of each at said audio segments;
   starting a timer for each of said audio segments, the timer started for each particular audio segment indicating a time period required for playing the particular audio segment based upon the respective size of the particular audio segment, each required time period being sufficient for receiving another audio segment if less than all of the audio segments of the complete audio message have been received;

clearing one of said timers prior starting a new one of said timers; and sending said complete audio message to said telephony audio interface when an active one of said timers expires.

2. The method of claim 1, wherein said audio segments are randomly sized.

3. The method of claim 1, wherein each said timer is started upon receiving an associated one of said audio segments.

4. The method of claim 1, said sending step further comprising:

initiating said sending step over a different thread of execution when an active one of said timers expires.

5. The method of claim 1, said sending step comprising:

sending each received audio segment of said complete audio message in a sequence in which said audio segments were received and without time delays disposed between adjacent ones of said audio segments.

6. The method of claim 5, further comprising:

said telephony interface playing said complete audio message.

7. The method of claim 6, wherein said complete audio message is played without time delays disposed between adjacent ones of said audio segments.

8. A machine-readable storage having stored thereon, a computer program having a plurality of code sections, said code sections executable by a machine for causing the machine to perform the steps of:

receiving audio segments of a complete audio message and storing said audio segments in memory;

differentiating each of said audio segments one from one another by detecting at least one of periods of silence and periods in which no audio is received between a pair of consecutive portions of audio data;

determining respective sizes of each of said audio segments;

starting a timer for each of said audio segments, the timer started for each particular audio segment indicating a time period required for playing the particular audio segment based upon the respective size of the particular audio segment, each required time period being sufficient for receiving another audio segment if less than all of the audio segments of the complete audio message have been received;

clearing one of said timers prior starting a new one of said timers; and sending said complete audio message to said telephony audio interface when an active one of said timers expires.

9. The machine-readable storage of claim 8, wherein said audio segments are randomly sized.

10. The machine-readable storage of claim 8, wherein each said timer is started upon receiving an associated one of said audio segments.

11. The machine-readable storage of claim 8, said sending step further comprising:

initiating said sending step over a different thread of execution when an active one of said timers expires.

12. The machine-readable storage of claim 8, said sending step comprising:

sending each received audio segment of said complete audio message in a sequence in which said audio segments were received and without time delays disposed between adjacent ones of said audio segments.

13. The machine-readable storage of claim 12, further comprising:

said telephony interface playing said complete audio message.

14. The machine-readable storage of claim 13, wherein said complete audio message is played without time delays disposed between adjacent ones of said audio segments.

15. A method of providing streaming audio to a non-streaming telephony audio interface comprising:

receiving audio segments of a complete audio message and storing said audio segments in memory;

differentiating each of said audio segments one from another by detecting at least one of periods of silence and periods in which no audio is received between a pair of consecutive portions of audio data;

determining a size of each differentiated audio segment received;

determining a time period required for audibly playing in real-time each audio segment received;

registering a callback as each audio segment is received, the callback implementing a timer set for a time based on a size of a corresponding audio segment if less than all of the audio segments of the complete audio massage have been received;

clearing one of said timers prior to starting a new one of said timers; and sending said complete audio message to said telephony audio interface when an active one of said timers expires.

16. The method of claim 15, wherein in audio segment is randomly sized.

* * * * *